Patented Oct. 23, 1951 2,572,798

UNITED STATES PATENT OFFICE 2,572,798

PHONOGRAPH RECORD MOLDING COMPOSITIONS AND RECORDS

Joseph W. Ayers, Easton, Pa., assignor to Agrashell, Inc., a corporation of Delaware No Drawing. Application November 28, 1947, Serial No. 788,647

23 Claims. (Cl. 260—17.4)

This invention relates to vinyl resin base phonograph records and to compositions from which such records can be molded. More specifically the invention relates to filled vinyl resin base sound reproducing records which usually take the form of discs or cylinders and have a continuous spiral groove impressed on one or both surfaces thereof into which sound modulations are recorded and reproduced by a stylus or needle as the groove travels past the stylus.

Vinyl resin based records have in part replaced shellac base records because of superior durability and other desirable properties. Expansion of the market for Vinylite resin base records has been greatly hampered by a number of factors including their higher cost due to the higher price paid for vinyl resins than for shellac and due to the greater expense connected with the molding of flawless records. Records made from unfilled vinyl resins possess low surface noise and give faithful reproduction of high frequency sound. Although the addition of conventional fillers to the compositions may improve reproduction fidelity of the records produced therefrom, it is generally accepted that such addition in required amounts, no matter how finely ground the filler may be, increases the surface noise. Some commercial Vinylite records contain a small amount of filler as a compromise, i. e., from 7.5% to 20% of a finely divided inorganic filler.

In attempts to lower the cost of vinyl resin base records, operators have tried to introduce substantial amounts of many different extenders without complete success, for inclusion of such extenders has produced discs which have an increased surface noise to signal ratio and which are rigid, brittle and mechanically weak and hence easily broken. Such compositions furthermore have had poor thermoplastic flow characteristics resulting in increased difficulty and cost of pressing. Among the extenders heretofore tried are silicas, silicates, carbonates, sulphates, felspars and carbon pigments. Commercial Vinylite base record compositions containing 20% by weight of diatomaceous silica have decreased thermoplastic flow properties and the resulting records have a high surface noise level, high needlewear and poor reproducing fidelity particularly at high frequency.

Attempts have also been made to produce Vinylite base records from compositions containing various organic extenders including wood flour, cotton flock, and certain ligno-cellulose materials, but the records produced therefrom have had a number of poor properties not acceptable to commercial use including noisiness, weakness, fast wearing qualities and generally also instability due to water absorption. To overcome the poor wearing qualities of the records containing such organic material as the filler, one prior experimenter has suggested the addition of a diatomaceous earth filler along with the organic filler of 300 mesh screen size, and although some improvement in wear was obtained, the records were made undesirable because of noise characteristics.

The principal objects of the present invention are to provide sound reproducing or phonograph records having not only desirable qualities of reproducibility, longer playing life and of sound quality, but also of firmness, rigidity and nonbreakability. A further object is to produce phonograph records which are cheaper to produce than the present commercial Vinylite base records, but are also superior in fidelity of reproduction, in durability and in other respects.

Viewed broadly, the present invention is concerned with phonograph record compositions containing a vinyl resin base and substantial amounts of a very finely divided, hard, ligno-cellulose filler of which walnut shell flour is an example. The record molding compositions containing this combination have improved thermoplastic flow and a short pressing cycle when modified with the proper types and amounts of plasticizers, stabilizer for the resin, and lubricants. The incorporation of fillers of this character does not render the records brittle or mechanically weak nor does it perceptibly affect the noise level, but instead, due to their reinforcing effect, the said fillers in fact improve the mechanical strength and improve the reproducing qualities at high frequency.

The invention also contemplates phonograph record compositions containing in addition to the vinyl resin base and the ligno-cellulose extender a reinforcing elastomer. When substantial amounts of the extender are included in the record compositions, the addition of the elastomer is of special value in imparting greater elasticity and greater strength. The reinforcing elastomer furthermore assists the molding because of its plasticizing qualities.

The phonograph record compositions containing the three ingredients discussed above are substantially improved by the presence of other ingredients in minor amounts including a stabilizer for the vinyl resin and an antioxidant for the reinforcing elastomer.

In addition to these ingredients, the compositions preferably include a small amount of a conventional plasticizer for the resin base, a hard wax or other mold lubricant and a color pigment.

The present invention contemplates the employment of any phonograph vinyl resin base, many suitable examples of which are described in the patent and other literature. The preferred vinyl resins are those resulting from the copolymerization of a vinyl halide such as vinyl chloride and an oxygen-containing vinyl compound of which the vinyl ester of aliphatic acids such as vinyl acetate is an example. Mixtures containing about 70% by weight of vinyl halide and 30% or less by weight of the vinyl ester of an aliphatic acid (formic, acetic, propionic and butyric, being examples) generally lead to most acceptable results in producing high quality records. Instead of the vinyl chloride-vinyl ester resin base, there may alternatively be employed polyvinyl acetate, polyvinyl chloride, polyvinylidene chloride, polyvinyl butyrate and other like resins. The resin-like vinyl compounds in the foregoing list are included in the general term "a vinyl resin" as herein employed.

A stabilizer is ordinarily employed in the composition in order to prevent the vinyl resin from being decomposed by the action of ultra violet light or elevated temperatures. Conventional stabilizing agents such as calcium carbonate, lime, hydrated lime, lead carbonate, lead titanate, and calcium stearate are satisfactory.

When especially large amounts of ligno-cellulose extender are employed, the phonograph record composition may be further plasticized by adding to the composition a small amount of any of the known plasticizers, such as phthalic esters, chlorinated diphenyl derivatives, tricresyl derivatives, halogenated naphthalene derivatives, glycol esters and the like. Among the wax lubricants which may be employed, there may be mentioned carnauba, montan and candelilla waxes.

The reinforcing elastomer employed in the extended vinyl resin base compositions of the invention may be defined further as those elastic, plastic rubbery compounds which are compatible with the vinyl resin employed, as rubber compounds, synthetic rubbers and rubber-like products. A number of vinyl resin-compatible elastomers are described in the literature and these will operate in the present invention with varying degrees of success. The rubber compounds should not be confused with resinous materials or fractions extracted from rubber which, though possessing plasticizing properties, do not possess the required elasticizing properties.

The preferred elastomer is a butadiene synthetic rubber. More specifically, the preferred elastomer is a butadiene-acrylonitrile copolymer or rubber containing about 35% acrylonitrile by weight. When less than 15% and preferably less than 10% of this last mentioned elastomer is contained in the molding composition, the records produced therefrom have increased stability and reduced permanent set and the compositions themselves have improved thermoplastic flow coupled with a shorter pressing cycle. In addition to this specific butadiene-acrylonitrile, other butadiene rubbers containing any of a wide range of percentages of acrylonitrile may be employed. Elastomers produced from butadiene and chloroprene or other modifying agents may alternatively be used.

The ligno-cellulose extenders used in the compositions and records of the present invention are hard, dense non-absorbent, non-fibrous, natural vegetable shell materials containing at least 45% by weight of combined pentosans, hexosans and lignins. They are preferably employed in amounts of from 35% to 60% by weight, but amounts as low as 20% can be used to advantage in the compositions. The materials contemplated include endocarps as the shells of English walnuts, black walnuts, pecans, brazil nuts, cocoanuts and the like; also the pits of apricots, olives, dates, peaches and the like and also certain hard, dense non-fibrous barks of a number of trees. The ligno-cellulose extender used in the composition must be of very fine particle size to obtain acceptable results, i. e., the particles should all be smaller than 30 microns and at least 90% of the same should be smaller than 25 microns. When in this fine condition, 40% by volume may be added to the composition without perceptibly increasing the surface noise level of the records produced from it, or to a degree as high as that of the best prior filled commercial records. The extender contributes dimensional stability, greater faithfulness of reproduction, increased wear resistance, improved processing features and a lowering of the cost of the composition. The wear resistance of the records is very high even in the absence of any abrasive inorganic filler.

Ligno-cellulose fillers exceptionally satisfactory in the compositions of the present invention are those ground by the process and apparatus described in my copending application, Serial No. 683,226 filed July 12, 1946, now Patent Number 2,561,043, and classified by the process of my application Serial No. 683,227 also filed on July 12, 1946, and now Patent Number 2,554,450. A typical particle distribution in the ground walnut shell flour is 0% particles greater than 30 microns, 90% less than 25 microns, 60% less than 20 microns, 20% smaller than 10 microns, all parts being by weight; the average diameter of such material being less than 12 microns and the specific surface area approximately 5,000 sq. cm. per gram.

A preferred phonograph record composition may be produced by compounding together the following ingredients:

*Example I*

| Material: | Parts by weight |
|---|---|
| Vinyl chloride-acetate resin, (87%:13%) | 49.00 |
| Dioctyl phthalate | 3.00 |
| Hydrated lime | 1.00 |
| Butadiene acrylonitrile copolymer (35% acrylonitrile) | 4.50 |
| Age-rite powder (phenyl-beta-naphthalamine) | .01 |
| Carnauba wax | .50 |
| Ligno-cellulose extender | 40.00 |
| Channel carbon black (Columbian Carbon Co. No. 52) | 1.99 |

The percentages in the above compositions may be varied considerably although some loss in valuable properties may occur as a result thereof.

The proportions may ordinarily be varied in accordance with percentages in the following table, the invention, however, not being limited thereto in its broadest aspects.

*Example II*

| Material: | Parts by weight |
|---|---|
| Vinyl chloride-acetate resin, (87%:13%) | 30.00 to 60.00 |
| Dioctyl phthalate | 0.00 to 10.00 |
| Hydrated lime | .50 to 2.00 |
| Butadiene acrylonitrile copolymer (35% acrylonitrile) | 0.00 to 10.00 |
| Age-rite powder (phenyl-beta-naphthylamine) | 0.00 to .05 |
| Carnauba wax | 0.00 to 3.00 |
| Ligno-cellulose extender | 35.00 to 60.00 |
| Channel carbon black (Columbian Carbon Co. No. 52) | 00.0 to 2.00 |

*Example III*

| Material: | Parts by weight |
|---|---|
| Vinyl chloride-acetate resin, (87%:13%) | 50.00 |
| Lead stearate | 1.00 |
| Carnauba wax | .50 |
| Ligno-cellulose extender | 39.00 |
| Dioctyl phthalate | 8.50 |
| Color | 1.00 |

The percentages in this example may be varied considerably. The limits of such variations are given as follows:

*Example IV*

| Material: | Parts by weight |
|---|---|
| Vinyl chloride-acetate resin, (87%:13%) | 30.00 to 60.00 |
| Plasticizers | 0.00 to 10.00 |
| Stabilizer | 0.00 to 2.00 |
| Lubricants | 0.00 to 2.00 |
| Ligno-cellulose extender | 30.00 to 60.00 |
| Color | 0.00 to 2.00 |

*Example V*

| Material: | Parts by weight |
|---|---|
| Vinyl chloride acetate copolymer, (75%:25%) | 33.50 |
| Cumarone indene resin | 30.00 |
| Lead stearate | 1.00 |
| Carnauba wax | .50 |
| Ligno-cellulose filler | 30.00 |
| Dioctyl phthalate | 5.00 |

This particular formulation produces records of good playing qualities which have fairly high resistance to wear, but which are not mechanically as strong as, for example, pure vinyl resin records like those of Examples I and II.

*Example VI*

| Material: | Parts by weight |
|---|---|
| Vinyl chloride acetate copolymer, (87%:13%) | 50.00 |
| Lead stearate | 1.00 |
| Wax | .50 |
| Walnut shell flour (30 microns) | 39.25 |
| Dioctyl phthalate | 8.00 |
| Carbon black | 1.00 |
| Sulfonated castor oil wetting agent | .25 |

In the foregoing formula the sulfonated castor oil wetting agent may be replaced by a non-ionic wetting agent such as an organic amide of lauric acid containing 70% non-ionic derivatives and 30% cationic derivatives, for example Sotex-NC.

The presence of the wetting agent in the above-described composition influences the rate at which the molded product can be milled by increasing the ease and rapidity with which such operation can be accomplished. Furthermore, the finished pressed record has a higher surface lustre and therefore a more pleasing appearance. During the formulation the wetting agent aids in the dispersion of the walnut shell flour or other extender and as a result thereof serves to lower the surface noise level of the records produced therefrom.

The dioctyl phthalate employed in the examples may be wholly or in part replaced by a linear high molecular weight polyester resin prepared by the reaction of a dibasic acid with a dihydric aliphatic alcohol. In Example III the amount of dioctyl phthalate could be reduced from 8.50 parts to 1.70 parts and then 6.80 parts of the polyester resin could be added.

The vinyl resin content may be in part replaced by any of the so called extender resins compatible with the vinyl resin, as with a cumarone indene resin or with a petroleum resin such as, a refined still bottom residue obtained from the manufacture of petroleum products.

With a definite sacrifice in quality, the amount of extender in the above compositions of the examples may be increased if it is essential that a cheaper record be produced. Such records, however, are noisier and weaker.

The compositions of the invention may be compounded on conventional processing equipment. Mixing times and temperatures in the same range as now used with other conventional compounds may be employed. After the individual components are weighted out they are preferably mixed dry for a period of a few minutes and then placed in a Banbury or similar type mixer or upon differential rolls. The composition is then worked for several minutes until the dispersion of the extender used is complete, the temperature employed suitably being in the neighborhood of 270° F. After being cut a number of times with a doctor blade, the stock is formed into biscuits in conventional manner. In the molding or pressing operation the biscuits are suitably heated to 210° F. or above and pressure of from 1500 to 4000 pounds per square inch is applied, depending upon the type and size of record to be pressed. Steam heating for a period of seven seconds to a stamper temperature of 270° F. is usually sufficient, after which cool water is applied to the die for thirty seconds or more, depending upon the temperature of the cooling water used. The total pressing cycle may therefore be as little as thirty-seven seconds.

Because the composition is highly loaded with the ligno-cellulose extender, air bubbles are not entrapped in the pressed material and hence the percentage of imperfect and rejected records pressed is much less than when ordinary Vinylite compositions are pressed. The rippled flash from the record can be removed easily by breaking it off by hand, which advantage is in strong contrast to the tough, horny Vinylite flash requiring cutting or dieing. The scrap and trimmings from the pressing operation of the present compositions may be suitably reground on disintegrating mills commonly used to process shellac scrap. The pre-heating required and other problems encountered in the recovery of Vinylite scrap are eliminated.

It should be understood that the present invention is not limited to the specific details set out but that it extends to all novelty within the general tenor of the specification and scope of the claims as permitted by the prior art. The proportions or percentages set forth in the claims refer to weight of the materials.

I claim:

1. A phonograph record molding composition comprising a vinyl resin base, the filler content of which consists essentially only of a very finely divided, hard ligno-cellulose extender containing at least 45% of combined pentosans, hexosans and lignins, the particles of which are not more than 30 microns in diameter.

2. A filled vinyl resin base phonograph record having superior sound reproducing fidelity particularly at high frequencies and at the same time giving forth appreciably no greater surface noise than corresponding unfilled or pure vinyl resin base records, the filler content being a very finely divided, hard ligno-cellulose extender containing at least 45% of combined pentosans, hexosans and lignins, the particles of which are not more than 30 microns in diameter.

3. A phonograph record, vinyl resin base molding composition containing as its filler content a hard ligno-cellulose extender containing at least 45% of combined pentosans, hexosans and lignins, the particles of which are not more than 30 microns in diameter and 90% of which are finer than 25 microns.

4. A phonograph record, vinyl resin base molding composition having a filler content of hard, ligno-cellulose, extender containing at least 45% of combined pentosans, hexosans and lignins, the particles of which are not more than 30 microns in diameter and 90% of which are finer than 25 microns, said composition containing also a plasticizer for said resin.

5. A phonograph record molding composition comprising a vinyl resin base, a butadiene synthetic rubber elastomer and a very finely divided hard ligno-cellulose extender, the particles of which are not more than about 30 microns in diameter.

6. A phonograph record molding composition comprising a vinyl resin base, a butadiene synthetic rubber elastomer, an anti-oxidant for the elastomer, and from 20 to 60% of a very finely divided, hard, ligno-cellulose extender containing at least 45% of combined pentosans, hexosans and lignins, the particles of which are not more than about 30 microns in diameter.

7. A phonograph record molding composition comprising a vinyl resin base, a butadiene synthetic rubber elastomer, an antioxidant for the elastomer, a mold lubricant and a very finely divided, hard, ligno-cellulose extender containing at least 45% of combined pentosans, hexosans and lignins, the particles of which are not more than about 30 microns in diameter.

8. A phonograph record molding composition comprising a vinyl resin base, a plasticizer for said resin, a butadiene synthetic rubber elastomer, an antioxidant for the elastomer, a mold lubricant and a filler content composed of very finely divided, hard, ligno-cellulose extender containing at least 45% of combined pentosans, hexosans and lignins, the particles of which are not more than about 30 microns in diameter.

9. A phonograph record molding composition comprising a vinyl resin base, stabilizing agent for said resin and a filler content consisting essentially only of nut shell flour the particles of which are not more than 30 microns in diameter and 90% of which are finer than 25 microns.

10. A phonograph record molding composition comprising a copolymer of a vinyl halide and a vinyl ester of an aliphatic acid, a stabilizer for said copolymer, a butadiene synthetic rubber elastomer and a filler content consisting essentially only of a very finely divided, hard, ligno-cellulose nut shell flour extender containing at least 45% of combined pentosans, hexosans and lignins, the particles of which are not more than 30 microns in diameter.

11. A phonograph record molding composition comprising a vinyl resin base, a stabilizing agent for said resin, a butadiene synthetic rubber elastomer, an antioxidant for said elastomer, a mold lubricant and a very finely divided hard ligno-cellulose extender containing at least 45% of combined pentosans, hexosans and lignins, the particles of which are not more than about 30 microns in diameter.

12. A phonograph record molding composition comprising a vinyl resin base, and a hard ligno-cellulose extender the particles of which are not more than 30 microns in diameter and 90% of which are finer than 25 microns, the said record being free of any hard inorganic filler.

13. A phonograph record molding composition comprising a vinyl resin base, a vinyl resin-compatible butadiene rubber elastomer, and a very finely divided hard ligno-cellulose extender containing at least 45% of combined pentosans, hexosans and lignins, the particles of which are not more than about 30 microns in diameter.

14. A phonograph record molding composition comprising a vinyl resin base, a butadiene synthetic rubber elastomer and very finely divided walnut shell flour, the particles of which are not more than about 30 microns in diameter.

15. A vinyl resin base phonograph record reinforced and plasticized by the presence of from 2% to 15% of a butadiene synthetic rubber elastomer and extended out further by the presence of a very finely divided, hard, ligno-cellulose filler containing at least 45% of combined pentosans, hexosans and lignins, in a quantity of from 20% to 60%, the particles of which are not more than about 30 microns in diameter.

16. A phonograph record molding composition comprising a vinyl resin base, a butadiene rubber elastomer compatible with the vinyl resin and a very finely divided, hard, ligno-cellulose filler containing at least 45% of combined pentosans, hexosans and lignins, the particles of which are not more than 30 microns in diameter and 90% of which are finer than 25 microns.

17. A phonograph record molding composition comprising a vinyl resin base, a plasticizer for said resin, a stabilizing agent for said resin, a butadiene-acrylonitrile rubber elastomer compatible with the vinyl resin, an antioxidant for said elastomer, a mold lubricant and a very finely divided, hard, ligno-cellulose extender containing at least 45% of combined pentosans, hexosans and lignins, the particles of which are not more than about 30 microns in diameter.

18. A phonograph record molding composition comprising a copolymer of vinyl halide and a vinyl ester of an aliphatic acid, and a filler content consisting essentially only of a very finely divided hard ligno-cellulose extender containing at least 45% of combined pentosans, hexosans and lignins, the particles of which are not more than 30 microns in diameter.

19. A phonograph record molding composition comprising a vinyl halide-vinyl ester of an aliphatic acid copolymer, a vinyl resin-compatible butadiene-acrylonitrile elastomer and a very finely divided, hard, ligno-cellulose extender containing at least 45% of combined pentosans, hexosans and lignins, the particles of which are not more than about 30 microns in diameter.

20. A phonograph record molding composition comprising a vinyl halide-vinyl acetate copolymer, a butadiene-acrylonitrile elastomer and a filler content consisting of a finely divided, hard, ligno-cellulose extender containing at least 45% of combined pentosans, hexosans and lignins, the particles of which are not more than about 30 microns in diameter.

21. A phonograph record molding composition comprising a vinyl chloride-vinyl acetate resin copolymer base, a butadiene-acrylonitrile elastomer and a hard, ligno-cellulose extender containing at least 45% of combined pentosans, hexosans and lignins, the particles of which are not more than 30 microns in diameter and 90% of which are finer than 25 microns.

22. A phonograph record constructed of a composition comprising from 30% to 60% vinyl resin base, up to 10% plasticizer for said resin, .5% to 2% stabilizer for said resin, up to .05% antioxidant for said elastomer, up to 3% mold lubricant, 35% to 60% very finely divided ligno-cellulose extender containing at least 45% of combined pentosans, hexosans and lignins, the particles of which are not more than about 30 microns in diameter, and up to 2% of a coloring agent.

23. A phonograph record constructed of a composition comprising from 30% to 60% vinyl resin base, up to 10% plasticizer for said resin, .5% to 2% stabilizer for said resin, up to 10% of a butadiene synthetic rubber elastomer, up to .05% of an antioxidant for said elastomer, up to 3% of a mold lubricant, 20 to 60% of a very finely divided nut shell flour, the particles of which are not more than about 30 microns in diameter, and up to 2% of a coloring agent.

JOSEPH W. AYERS.

REFERENCES CITED

The following references are of record in the file of this patent:

UNITED STATES PATENTS

| Number | Name | Date |
|---|---|---|
| 2,006,378 | Whyte et al. | July 2, 1935 |
| 2,307,180 | Yngve | Jan. 5, 1943 |
| 2,319,182 | Van der Pyl | May 11, 1943 |
| 2,330,353 | Henderson | Sept. 28, 1943 |

OTHER REFERENCES

Modern Plastics, article by Kenny, Sept. 1946, pages 106, 107.